United States Patent
Khodjet-Kesba et al.

(10) Patent No.: US 10,782,175 B2
(45) Date of Patent: Sep. 22, 2020

(54) METHOD FOR DETERMINING THE FILL LEVEL AND FILL LEVEL METER

(71) Applicant: KROHNE S.A.S., Romans-sur-Isè (FR)

(72) Inventors: Mahmoud Khodjet-Kesba, Romans-sur-Isère (FR); Vincent Pichot, Romans-sur-Isère (FR)

(73) Assignee: KROHNE S.A.S., Romans-sur-Isere (FR)

( * ) Notice: Subject to any disclaimer, the term of this patent is extended or adjusted under 35 U.S.C. 154(b) by 301 days.

(21) Appl. No.: 15/951,342

(22) Filed: Apr. 12, 2018

(65) Prior Publication Data

US 2018/0306632 A1    Oct. 25, 2018

(30) Foreign Application Priority Data

Apr. 24, 2017    (DE) .......................... 10 2017 108 702

(51) Int. Cl.
*G01F 23/284*    (2006.01)
*G01S 7/41*    (2006.01)
(Continued)

(52) U.S. Cl.
CPC ........ *G01F 23/284* (2013.01); *G01F 23/0061* (2013.01); *G01F 23/0076* (2013.01);
(Continued)

(58) Field of Classification Search
CPC .......... G01B 7/26; G01R 27/28; G01N 29/18; G01S 13/88; G01S 13/02; G01S 7/411;
(Continued)

(56) References Cited

U.S. PATENT DOCUMENTS

| 5,811,677 A | 9/1998 | Cournanc |
| 6,477,474 B2 | 11/2002 | Diede |

(Continued)

FOREIGN PATENT DOCUMENTS

| DE | 10 2009 002 785 A1 | 11/2010 |
| EP | 2 365 302 A1 | 9/2011 |

OTHER PUBLICATIONS

Relative permittivity. (Dec. 20, 2010). Knowino, an encyclopedia. Retrieved 18:52, Feb. 15, 2015 from http://knowino.org/w/index.php?title=Relative permittivity&oldid=4812.*

(Continued)

*Primary Examiner* — Catherine T. Rastovski
(74) *Attorney, Agent, or Firm* — David S. Safran; Roberts Calderon Safran & Cole, P.C.

(57) ABSTRACT

A method for determining the fill level of a process medium arranged in a container using a TDR fill level meter having at least one signal line for guiding an electromagnetic signal, a signal line head and an electronics unit, the signal line extending into the process medium, the method having at least the steps of generating a pulsed transmitter signal with the electronics unit, wherein the transmission signal propagates along the signal line as measuring signal with changing amplitude, detecting and evaluating at least one reflection signal with the electronics unit, wherein the reflection signal is a reflection of the measuring signal on an interface between a first and a second medium having different impedances, the relative permittivity of the second medium is determined at least in dependence on the amplitude of the measuring signal transmitted through the first medium and the amplitude of the reflection signal.

11 Claims, 3 Drawing Sheets

(51) Int. Cl.
  *G01S 13/88* (2006.01)
  *G01S 13/10* (2006.01)
  *G01F 23/00* (2006.01)

(52) U.S. Cl.
  CPC ............... *G01S 7/411* (2013.01); *G01S 13/10* (2013.01); *G01S 13/88* (2013.01)

(58) Field of Classification Search
  CPC .... G01S 13/10; G01F 23/284; G01F 23/0061; G01F 23/0076
  See application file for complete search history.

(56) References Cited

U.S. PATENT DOCUMENTS

| | | |
|---|---|---|
| 6,701,783 B2 | 3/2004 | Fehrenbach et al. |
| 6,782,328 B2 | 8/2004 | Lovegren et al. |
| 8,963,769 B2 | 2/2015 | Linden et al. |
| 9,316,480 B2 | 4/2016 | Weber et al. |
| 2009/0273506 A1* | 11/2009 | Delin .................... G01F 23/284 342/124 |
| 2013/0231877 A1 | 9/2013 | Weber et al. |
| 2014/0210488 A1* | 7/2014 | Weber .................... G01R 27/28 324/644 |

OTHER PUBLICATIONS

Michael Price, "Understanding Impedeances,", MIT Open Courseware, Spring 2007, Retrived Jul. 10, 2020 from https://ocw.mit.edu/high-school/engineering/audio-and-speaker-electronics/lecture-notes/MITHFH_lec_impedances.pdf.*

* cited by examiner

METHOD FOR DETERMINING THE FILL LEVEL AND FILL LEVEL METER

BACKGROUND OF THE INVENTION

Field of the Invention

The invention relates to a method for determining the fill level of a process medium arranged in a container using a fill level meter, wherein the fill level meter is designed as a TDR fill level meter, wherein the fill level meter has at least one signal line for guiding an electromagnetic signal, a signal line head and an electronics unit, wherein the signal line extends into the process medium and wherein the method comprises at least the following steps:

generating a pulsed transmitter signal with an amplitude $A_S$ by the electronics unit, wherein the transmission signal propagates along the signal line as measuring signal with changing amplitude, detecting and evaluating at least one reflection signal with an amplitude $A_{refl}$ by the electronics unit, wherein the reflection signal is a reflection of the measuring signal on an interface between a first and a second medium, wherein the first medium has a first impedance $z_0$ and the second medium has a second impedance $z_1$.

Additionally, the invention is based on a fill level meter for determining the fill level of a process medium in a container, comprising at least one signal line for guiding an electromagnetic signal, a signal line head and an electronics unit, wherein the electronics unit is designed for generating a pulse-like transmission signal, wherein the transmission signal propagates as measuring signal along the signal line, and wherein the electronics unit is designed for detecting and evaluating at least one reflection signal with an amplitude $A_{refl}$, wherein the reflection signal is a reflection of the measuring signal on an interface between a first and a second medium, wherein the first medium has a first impedance $z_0$ and the second medium has a second impedance $z_1$.

Description of Related Art

The determination of the fill level of a medium arranged in a container based on the time domain reflectometry (TDR) method is known from the prior art. TDR fill level meters have a signal line, which extends into the process medium to be measured during operation. The electromagnetic measuring signal is guided along the signal line to the process medium. The signal is reflected on the surface of the process medium due to the different impedance of the medium above the process medium and the process medium. The fill level of the process medium can be determined from the transit time of the reflected signal.

A parameter relevant in this context is the propagation speed of the electromagnetic measuring signal in the container and, in particular, in the medium above the process medium. This is dependent on the relative permittivity of the medium. If the medium arranged above the process medium is different than air or if the composition of the medium changes in the course of a measurement, then the knowledge of the relative permittivity of the medium with the measuring signal running through it improves the accuracy of the fill level determination.

Furthermore, the knowledge of the propagation speed of the measuring signal is also relevant when the interface of a multi-component process medium is determined, since the electromagnetic measuring signal, in this case, passes through two different media, namely the gaseous phase above the process medium and a component of the process medium.

The German Patent Application DE 10 2012 105 281 A1 and corresponding U.S. Patent Application Publication 2015/0168202 A1 disclose a fill level meter, wherein an additional waveguide is provided for determining the dielectric constant of a gaseous phase arranged above the process medium, which forms an interface with the gaseous phase to be measured, on which a substantial portion of the measuring signal supplied to the gaseous phase via the waveguide is reflected. Since the reflectivity is dependent on the dielectric constant of the medium bordering the interface, the amplitude of the reflected signal is a measure for the dielectric constant.

The presence of a further measuring arrangement for determining the dielectric constant has the disadvantage that, on the one hand, the mounting of the measuring arrangement in the container is not only associated with additional material costs and additional weight, but also is a source for thermal losses, which is disadvantageous, in particular in applications that require high temperatures. On the other hand, depending on the mounting site of the additional measuring arrangement, it is also possible that the process medium reaches and covers the waveguide, whereby a measurement of the dielectric constant of the medium above the process medium is no longer possible.

Additionally, a method for measuring the fill level of a filling material arranged in a container is known from German Patent Application DE 10 2009 002 785 A1, wherein changes in the composition of the gas located above the filling material are acknowledged. For this, a reference function is previously derived, which reproduces an amplitude course of the reflection signal reflected on the surface of the filling material, which is received by the measuring unit when a known reference gas is found above the filling material. During measurement operation, auxiliary functions are derived from the received reflection signals and compared to the reference function, wherein a deviation of the auxiliary function from the reference function indicates that the composition of the gas located above the filling material deviates from the reference gas. A determination of the relative permittivity of the medium above the process medium is not possible using this method.

SUMMARY OF THE INVENTION

Based on this prior art, the object of the invention is to provide a method for determining the fill level of a process medium arranged in a container, which has a particularly high measuring accuracy and, simultaneously, is relatively easy to implement. Additionally, the object of the invention is to provide a corresponding fill level meter.

According to a first teaching of the invention, the above-described object is achieved by a method described in the introduction in that the relative permittivity $\varepsilon_r$ of the second medium is determined at least in dependence on the amplitude of the measuring signal transmitted through the first medium and the amplitude $A_{refl}$ of the reflection signal.

It has been recognized that, in measuring the fill level of a medium arranged in a container using a TDR method, the reflections taking place on the interfaces between a first and a second medium can be used for determining the relative permittivity of the second medium. In the scope of the present invention, the medium on which the measuring signal is reflected back into the first medium is understood as a second medium.

The method according to the invention has the advantage that, in addition to the signal line arrangement for determining the fill level, no other measuring arrangements are arranged on the container, whereby the fill level meter is particularly simply constructed and the method is particularly easy to carry out. According to the invention, in addition to the transit time analysis of the measuring signal reflected on the surface of the process medium, the amplitude of at least one reflection on an interface between a first and a second medium is also evaluated. Thereby, the ratio of the amplitude of the reflection signal and the amplitude of the signal descending on the interface is evaluated for determining the relative permittivity. In an advantageous manner, both the prevailing measuring situation as well as the processes acting on the transit time and the amplitude of the measuring and reflection signals, such as changes of the composition of the upper gaseous phase, are taken into account in determining the fill level. As a result, the method according to the invention has a particularly high measuring accuracy.

According to an advantageous implementation, the measuring signal transmitted through the first medium results from the transmission signal taking into account the attenuation due to the propagation along the signal line and/or due to at least one further reflection on a further interface. Thereby, the attenuation due to the propagation of the measuring signal along the signal line is dependent both on the media through which the measuring signal passes as well as on the path that the measuring signal takes in the respective medium.

According to a further advantageous implementation, the ratio of the first impedance $z_0$ and the second impedance $z_1$ is additionally taken into account for determining the relative permittivity $\varepsilon_r$ of the second medium.

According to a further preferred implementation, the signal line head is connected to the container via a preferably flange-like process connection and the second medium is a gaseous medium that is arranged above the process medium, wherein the reflection of the measuring signal takes place on the interface of the preferably flange-like process connection and the interior of the container.

The determination of the relative permittivity $\varepsilon_{r,gas}$ of the gaseous medium above the process medium particularly preferably takes place according to the following formula:

$$\varepsilon_{r,gas} = \left( \frac{z_{1\_gas}}{z_{0\_SK}} \cdot \frac{\alpha_0 - \frac{A_{fl}}{A_S}}{\alpha_0 + \frac{A_{fl}}{A_S}} \right)^2$$

wherein $A_{fl}$ is the amplitude of the reflection signal of a reflection on the interface of the preferably flange-like process connection and the interior of the container, wherein $A_S$ is the amplitude of the generated transmission signal and the wherein $\alpha_0$ characterizes the attenuation of the measuring signal within the signal line head, wherein $z_{1\_gas}$ is the impedance of the gaseous medium that is arranged above the process medium and wherein $z_{0\_SK}$ is the impedance of the signal line head.

The impedance $z_{1\_gas}$ is preferably the impedance of air and it is determined, for example, when the container is empty.

According to a further advantageous implementation, the second medium is the process medium or, in the case of a multi-component process medium, the uppermost component of the process medium, wherein the reflection of the measuring signal takes place on the surface of the process medium or the uppermost component of the process medium and wherein the reflection signal has an amplitude $A_{lev}$. According to this implementation, the propagation speed can additionally or alternatively be determined using the process medium or, respectively, the uppermost component of the process medium.

This is then, for example, relevant when the process medium has several components and the position of the interface between two components, namely the uppermost and the second-uppermost components, is determined. Thereby, in the scope of the present invention, the determination of the position of an interface between two components of a process medium is also considered as a type of fill level measurement (of a part) of the process medium.

It is particularly preferred that both the relative permittivity and the propagation speed in the gaseous phase above the process medium as well as the relative permittivity and the propagation speed in the process medium or the uppermost component of the process medium are determined. According to this implementation, the position of an interface between two components of the process medium, in particular between the uppermost and the second-uppermost components of the process medium are determined particularly accurately.

It is particularly preferred that in order to determine the relative permittivity $\varepsilon_{r,pm1}$ of the process medium or of the uppermost component of the process medium, the amplitude of the reflection signal $A_{lev}$ is corrected in such a manner that the attenuation of the measuring signal due to the propagation in the gaseous medium arranged above the process medium is taken into account.

According to a further implementation of the method according to the invention, different attenuation coefficients $\alpha$ are taken into account in determining the corrected amplitude $A_{lev\_cr}$ in dependence on the fill level X of the process medium and, thus, on the path of the measuring signal. For example, different attenuation ranges can be differentiated in dependence on the path of the measuring signal along the signal line.

According to a further implementation, the corrected amplitude $A_{lev\_cr}$ is determined in dependence on the fill level X of the process medium according to one of the following formulas:

$$-A_{lev\_cr} = \frac{A_{lev}}{e^{\alpha_1 X}}$$

for $0 \leq X < X_1$, wherein $X_1$ is the distance to the process connection and wherein the range $0 \leq X < X_1$ defines a first attenuation range with an attenuation coefficient $\alpha_1$, $$-A_{lev\_cr} = \frac{A_{lev}}{e^{\alpha_2(X-X_1)} e^{\alpha_1 X_1}}$$

for $X_1 \leq X < X_2$, wherein $X_2$ is the distance to the process connection and wherein the range $X_1 \leq X < X_2$ defines a second attenuation range with an attenuation coefficient $\alpha_2$, $$-A_{lev\_cr} = \frac{A_{lev}}{e^{\alpha_3(X-X_2)} e^{\alpha_2(X_2-X_1)} e^{\alpha_1 X_1}}$$

for $X_2 \leq X < X_3$, wherein $X_3$ is the distance to the process connection and wherein the range $X_2 \leq X < X_3$ defines a third attenuation range with an attenuation coefficient $\alpha_3$.

According to one implementation, $X_1$=500 mm, $X_2$=1,800 mm and $X_3$=60,000 mm.

It is also possible to differentiate more or less than three attenuation ranges from one another. Furthermore, the above-mentioned values for classifying the attenuation ranges are only examples. A classification based on other paths, in particular in dependence on the medium above the process medium, is also possible.

The determination of the relative permittivity $\varepsilon_{r,pm1}$ of the process medium or of the uppermost component of the process medium takes place according to the following formula:

$$\varepsilon_{r,pm\_1} = \left( \frac{1 - \dfrac{A_{lev\_cr}}{\alpha_0 A_S \left(1 - \left(\dfrac{A_{fl}}{\alpha_0 A_S}\right)^2\right)}}{1 + \dfrac{A_{lev\_cr}}{\alpha_0 A_S \left(1 - \left(\dfrac{A_{fl}}{\alpha_0 A_S}\right)^2\right)}} \right)^2 \cdot \varepsilon_{r,gas},$$

wherein $A_{fl}$ is the amplitude of the reflection signal of a reflection on the interface of the preferably flange-like process connection and the interior of the container, wherein $A_S$ is the amplitude of the generated transmission signal, wherein $\alpha_0$ characterizes the attenuation of the measuring signal within the signal line head, and wherein $A_{lev\_cr}$ is the amplitude of the reflection on the process medium corrected by the attenuation.

According to a further implementation of the method, the process medium has at least three components, and that in order to determine the position of an interface between one component n and another component (n+1), wherein the component n corresponds to the first medium and the component (n+1) corresponds to the second medium, at least the relative permittivity $\varepsilon_{rpm\_n}$ of the component n is determined, wherein the determination takes place using the following formula:

$$\varepsilon_{r,pm\_n} = \left( \frac{1 - \dfrac{A_{lev\_cr\_n}}{A_{x\_n}}}{1 + \dfrac{A_{lev\_cr\_n}}{A_{x\_n}}} \right)^2 \cdot \varepsilon_{r,pm\_(n-1)},$$

wherein $A_{lev\_cr\_n}$ is the corrected amplitude of the reflection signal of an amplitude $A_{lev\_n}$, wherein $A_{lev\_n}$ is the amplitude of the reflection signal of a reflection of the measuring signal on the interface between the component (n−1) and the component n, wherein the corrected amplitude takes into account the attenuation of the measuring signal due to the propagation in the gaseous medium above the process medium and/or in the component or the components of the process medium that is/are arranged above the component n, and wherein $A_{x\_n}$ is the amplitude of the measuring signal transmitted through the first medium or, respectively, the component n and wherein $A_{x\_n}$ is determined using the following formula:

$$A_{x\_n} = \alpha_0 A_S \left(1 - \left(\frac{A_{fl}}{\alpha_0 A_S}\right)^2\right) \left(1 - \left(\frac{\sqrt{\varepsilon_{r,gas}} - \sqrt{\varepsilon_{r,pm\_1}}}{\sqrt{\varepsilon_{r,gas}} + \sqrt{\varepsilon_{r,pm\_1}}}\right)^2\right)$$

$$\prod_{k=2}^{n-1} \left(1 - \left(\frac{\sqrt{\varepsilon_{r,pm\_k-1}} - \sqrt{\varepsilon_{r,pm\_k}}}{\sqrt{\varepsilon_{r,pm\_k-1}} + \sqrt{\varepsilon_{r,pm\_k}}}\right)^2\right) =$$

$$A_{x\_2} \prod_{k=2}^{n-1} \left(1 - \left(\frac{\sqrt{\varepsilon_{r,pm\_k-1}} - \sqrt{\varepsilon_{r,pm\_k}}}{\sqrt{\varepsilon_{r,pm\_k-1}} + \sqrt{\varepsilon_{r,pm\_k}}}\right)^2\right)$$

wherein $A_{x\_2}$ is the amplitude of the measuring signal on the interface between the uppermost and the second-uppermost component of the process medium.

According to a further advantageous implementation, based on the determined relative permittivity $\varepsilon_r$, the propagation speed of the measuring signal and the reflection signal is determined in the second medium and the transit time of the measuring signal and the reflection signal is determined and, based thereupon, at least the fill level of the process medium and/or the position of an interface between a first and a second component of a multi-component process medium are determined.

The determination of the fill level has a particularly high accuracy due to the consideration of the prevailing propagation speed of the transmission and reflection signals. Of particular advantage, changes of the relative permittivity are also recognized and, using the changes of the propagation speed, are taken into account in determining the fill level.

If the process medium has more than one component, wherein the different components are separated from one another by at least one interface, then additionally or alternatively, the position of the at least one interface is determined. It is also possible that the process medium has more than two components and, thus, more than one interface. With the method described above, it is also possible to determine the positions of the different interfaces taking into account the propagation speed in the individual components of the process medium.

It is essentially possible to determine initially the propagation speed in the medium via the measuring permittivity and, from this, to determine the fill level of the process medium. In comparison, it is also possible to determine initially the fill level of the process medium by assuming that, for example, air is located above the process medium in the container. Based on the permittivity determined according to the invention, a correction factor is calculated for correcting the fill level, insofar as the propagation speed deviates from the propagation speed of air, considering a tolerance range. Thereby, the determination of the relative permittivity takes place in real time or also at regular or irregular time intervals.

According to a second teaching of the invention, the object demonstrated in the introduction is achieved by a fill level meter mentioned in the introduction in that the electronics unit is designed for determining the relative permittivity $\varepsilon_r$ of the second medium, at least in dependence on the amplitude of the measuring signal transmitted through the first medium and the amplitude $A_{refl}$ of the reflection signal.

According to a particularly preferred design, the fill level meter carries out one of the above-mentioned methods during operation.

In detail, there is a plurality of possibilities for designing and further developing the method according to the invention and the fill level meter according to the invention as will become apparent from the following description of preferred embodiments in conjunction with the accompanying drawings.

DETAILED DESCRIPTION OF THE INVENTION

Figure 1:
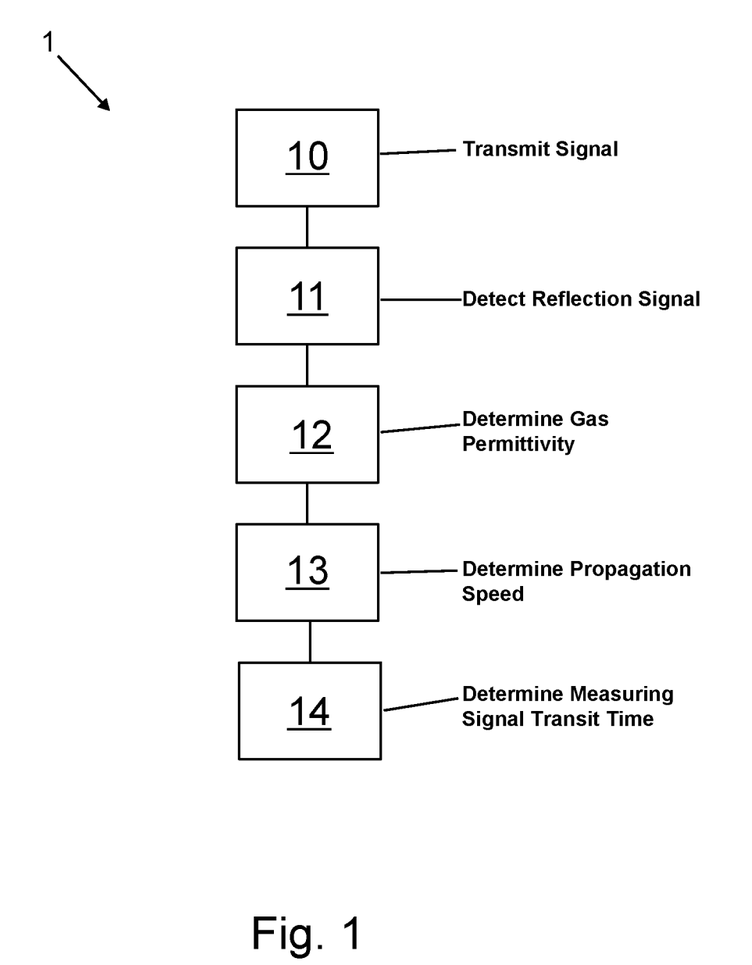
FIG. 1 is a flow chart of a first embodiment of a method according to the invention.
Figure 3:
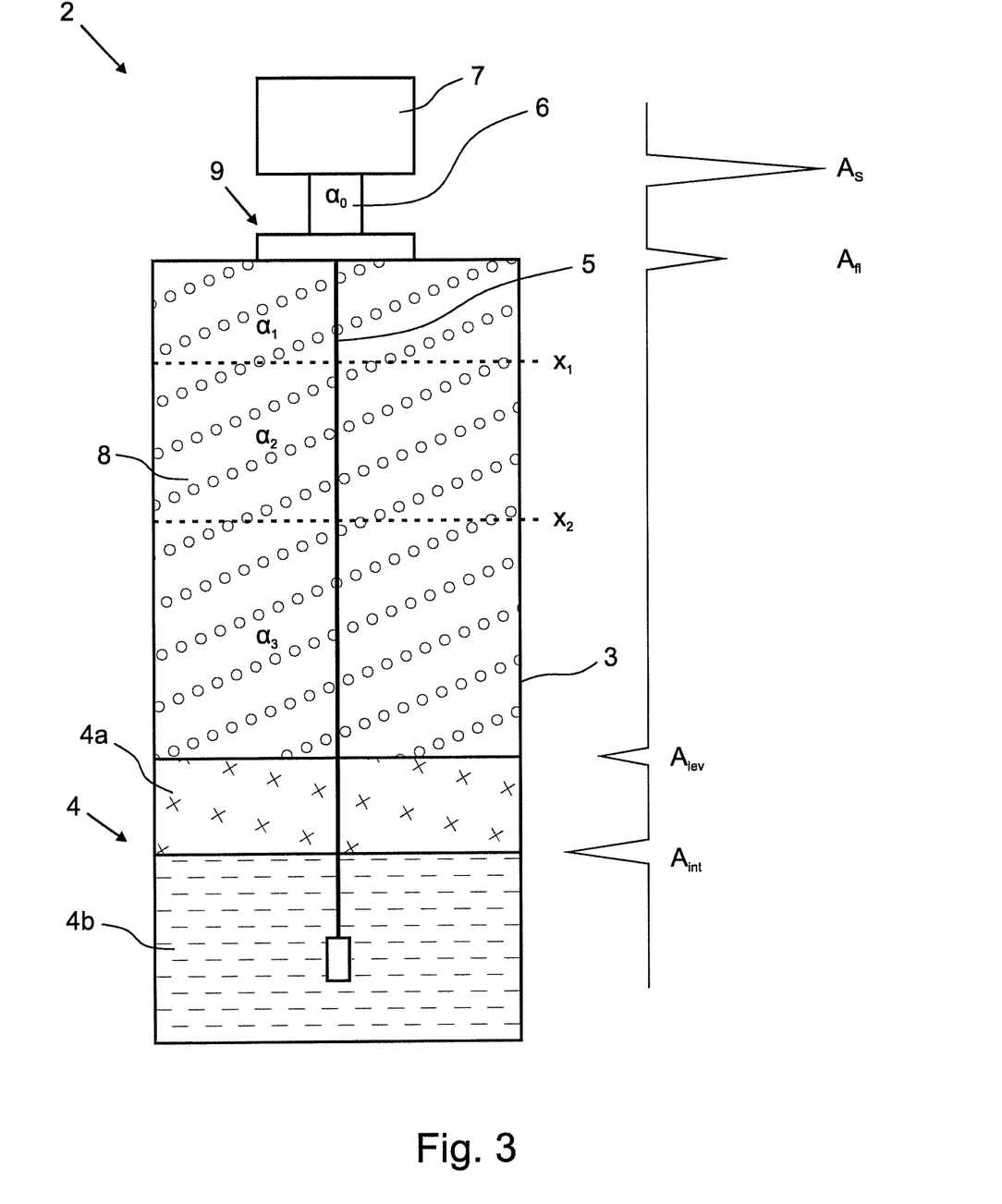

FIG. 1 shows a first embodiment of a method 1 according to the invention for determining the fill level of a process medium 4 arranged in a container 3 by means of a fill level meter 2 as illustrated in FIG. 3. The fill level meter 2 illustrated in FIG. 3 is designed as a TDR fill level meter. The fill level meter 2 has a signal line 5 for guiding an electromagnetic signal, a signal line head 6 and an electronics unit 7 for generating a pulse-like transmission signal, which propagates as measuring signal along the signal line 5 in the direction of the process medium 4. The signal line head 6 is connected to the container 3 via a flange-like process connection 9.

In the illustrated embodiment, the process medium 4 is composed of a first component 4a and a second component 4b. A gaseous phase 8 is arranged above the process medium 4.

The electronics unit 7 is further designed to detect and evaluate at least one reflection signal, wherein the reflection signal is a reflection of the measuring signal on an interface between a first and a second medium.

Additionally, the electronics unit 7 is designed for determining the relative permittivity $\varepsilon_r$ of the second medium at least in dependence on the amplitude of the measuring signal transmitted through the first medium and the amplitude $A_{refl}$ of the reflection signal.

In a first step 10 of the method illustrated in FIG. 1, a pulse-like transmission signal with an amplitude $A_S$ is generated by the electronics unit 7, which propagates as measuring signal with a changing amplitude along the signal line 5 in the direction of the process medium 4.

In a next step 11, a reflection signal with an amplitude $A_{fl}$ is detected and evaluated by the electronics unit 7.

The reflection signal with the amplitude $A_{fl}$ results from a reflection of the measuring signal on the interface of the flange-like process connection 9 and the interior of the container 3. In this case, the first medium is the material of the signal line head 6 and the flange-like process connection 9 and the second medium is a gaseous phase 8, which is arranged within the container 3 above the process medium 4.

The evaluation by the electronics unit 7 comprises the determination 12 of the relative permittivity $\varepsilon_{r,gas}$ of the gaseous phase 8 according to the following formula:

$$\varepsilon_{r,gas} = \left( \frac{z_{1\_gas}}{z_{0\_SK}} \cdot \frac{\alpha_0 - \frac{A_{fl}}{A_S}}{\alpha_0 + \frac{A_{fl}}{A_S}} \right)^2,$$

wherein $A_{fl}$ is the amplitude of the reflection signal of a reflection on the interface of the flange-like process connection and the interior of the container, wherein $A_S$ is the amplitude of the generated transmission signal and the wherein $\alpha_0$ characterizes the attenuation of the measuring signal within the signal line head 6, wherein $z_{0\_SK}$ is the impedance of the signal line head 6 and wherein $z_{1\_gas}$ is the impedance of the gaseous phase 8 above the process medium 4. In a next step 13, the propagation speed of the measuring signal through the gaseous phase 8 is determined from the relative permittivity $\varepsilon_{r,gas}$. Based on this, the fill level of the process medium 4 is determined in a next step 14 from the transit time of the measuring signal and the reflection signal reflected on the surface of the process medium 4.

This method 1 has the advantage of a particularly high measuring accuracy, since the transit time of the generated measuring signal dependent on the gaseous phase 8, which is arranged above the process medium 4, is determined in real time and is taken into account in determining the fill level.

Figure 2:
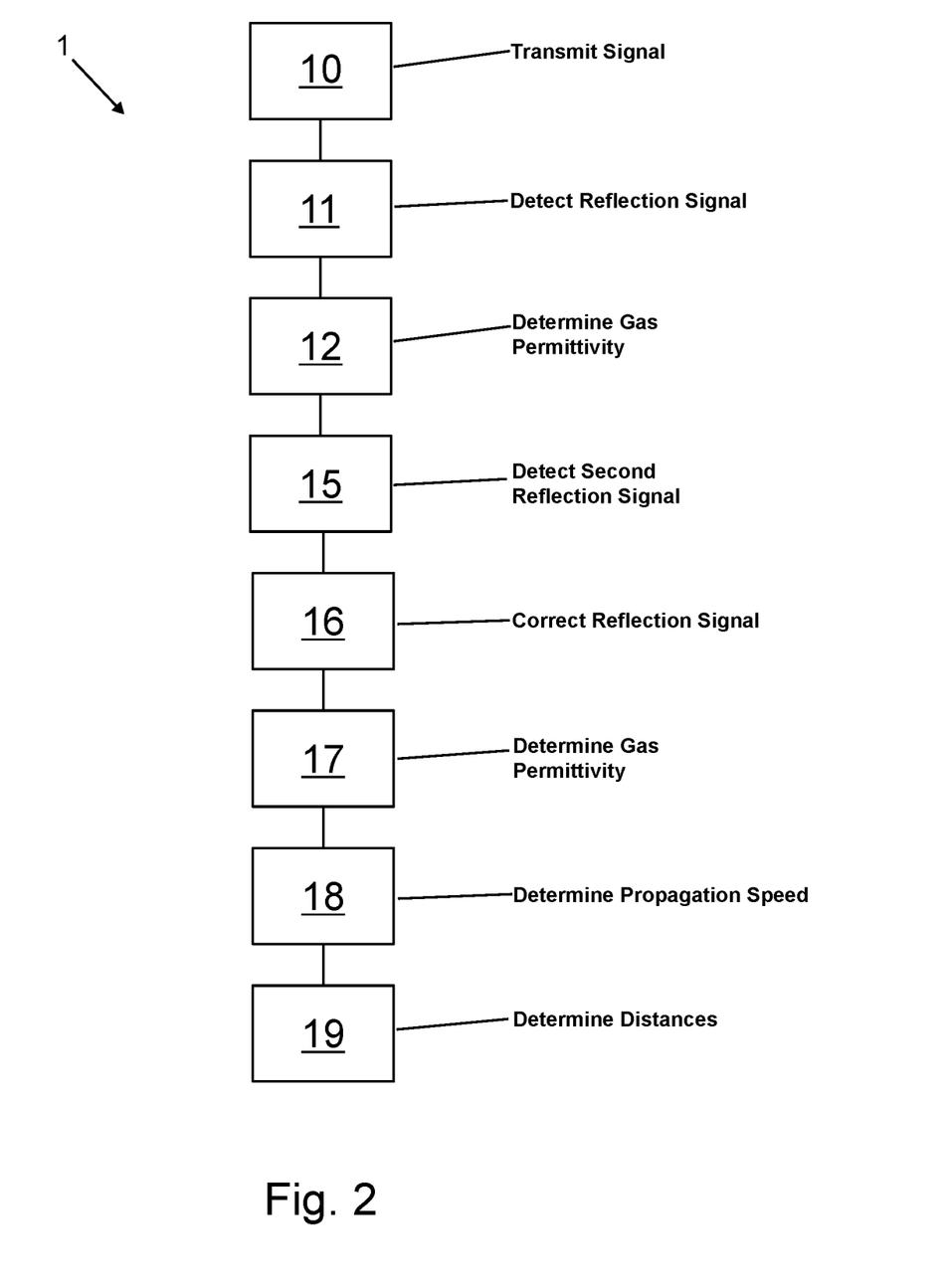
FIG. 2 is a flow chart of a second embodiment of a method according to the invention, and FIG. 3 schematically depicts a first embodiment of a fill level meter according to the invention.

FIG. 2 shows a further embodiment of a method 1 according to the invention for determining the fill level of a process medium 4 arranged in a container 3 by means of a fill level meter 2 illustrated in FIG. 3. According to the method 1 illustrated in FIG. 2, not only is the upper fill level of the process medium 4 arranged in the container 3 determined, but also the interface between the individual components 4a and 4b of the process medium 4.

In a first step 10 of the method 1, a pulse-like transmission signal with an amplitude $A_S$ is generated by the electronics unit 7, which propagates as measuring signal with changing amplitude along the signal line 5 in the direction of the process medium 4. In a next step 11, a first reflection signal with an amplitude $A_{fl}$ is detected and evaluated by the electronics unit 7.

According to the following formula, the permittivity $\varepsilon_{r,gas}$ of the gaseous phase 8 is determined from the amplitude $A_{fl}$ in a next step 12:

$$\varepsilon_{r,gas} = \left( \frac{z_{1\_gas}}{z_{0\_SK}} \cdot \frac{\alpha_0 - \frac{A_{fl}}{A_S}}{\alpha_0 + \frac{A_{fl}}{A_S}} \right)^2,$$

wherein, as above, $A_{fl}$ is the amplitude of the reflection signal of a reflection on the interface of the flange-like process connection and the interior of the container, wherein $A_S$ is the amplitude of the generated transmission signal and the wherein $\alpha_0$ characterizes the attenuation of the measuring signal within the signal line head 6, wherein $z_{0\_SK}$ is the impedance of the signal line head 6 and wherein $z_{1\_gas}$ is the impedance of the gaseous phase 8 above the process medium 4.

In a next step 15, a second reflection signal with an amplitude $A_{lev}$ that is based on a reflection of the measuring signal on the surface of the process medium 4, is detected and evaluated by the electronics unit 7.

In the illustrated embodiment, the fill level is located in an attenuation range at $X_2 \leq X < X_3$, wherein $X_2 = 1,800$ mm and $X_3 = 60,000$ mm. The reflection signal is corrected in a next step 16 for taking into account the attenuation of the measuring signal due to the propagation up to the reflective surface of the process medium 4 according to the following formula:

$$A_{lev\_cr} = \frac{A_{lev}}{e^{\alpha_3(X-X_2)}e^{\alpha_2(X_2-X_1)}e^{\alpha_1 X_1}}$$

wherein $X_1$=500 mm and $X_2$=1,800 mm.

In a subsequent step 17, the permittivity $\varepsilon_{r,pm\_1}$ is determined from the corrected reflection signal according to the following formula:

$$\varepsilon_{r,pm\_1} = \left( \frac{1 - \dfrac{A_{lev\_cr}}{\alpha_0 A_S \left(1 - \left(\dfrac{A_{fl}}{\alpha_0 A_S}\right)^2\right)}}{1 + \dfrac{A_{lev\_cr}}{\alpha_0 A_S \left(1 - \left(\dfrac{A_{fl}}{\alpha_0 A_S}\right)^2\right)}} \right)^2 \cdot \varepsilon_{r,gas},$$

wherein $A_{fl}$ is the amplitude of the reflection signal of a reflection on the interface of the flange-like process connection and the interior of the container 3, wherein $A_S$ is the amplitude of the generated transmission signal, wherein an characterizes the attenuation of the measuring signal within the signal line head 6, and wherein $A_{lev\_cr}$ is the amplitude of the reflection on the process medium 4a corrected by the attenuation.

In a next step 18, the respective propagation speed of the electromagnetic measuring signal through the gaseous phase 8 and through the first component 4a of the process medium 4 can be determined from the determined permittivites $\varepsilon_{r,gas}$ and $\varepsilon_{r,pm\_1}$.

In a next step 19, both the distance of the surface of the process medium 4 to the process connection 9 and, with it, the fill level of the process medium 4 as well as the position of the interface between the first component 4a and the second component 4b of the process medium 4 can be determined from the transit times.

In an alternative method 1, wherein the process medium 4 consists of more than two components, in addition to determining the relative permittivity and the propagation speed of the measuring signal in the gaseous phase 8 above the process medium 4 and in the uppermost component 4a of the process medium 4, the permittivity and the propagation speed are determined in lower-lying components. As a result, the position of lower-lying interfaces between further components of the process medium 4 can be particularly accurately determined.

As already described, FIG. 3 illustrates a first embodiment of a fill level meter 2 according to the invention. In addition to the fill level meter 2, the amplitudes of transmission signals or, respectively, the different reflection signals are schematically illustrated. The transmission signal generated by the electronics unit 7 has the amplitude $A_S$. The signal reflected on the interface of the flange-like process connection 9 and the interior of the container 3 has the amplitude $A_{fl}$. In the illustration, the impedance of the signal line head 6 or, respectively, the process connection 9 is less than the impedance of the gaseous phase 8.

The signal reflected on the surface of the process medium 4 has the amplitude $A_{lev}$. The illustration assumes that the impedance of the gaseous phase 8 is greater than the impedance of the first component 4a of the process medium 4. Thus, the amplitude $A_{lev}$ opposes the amplitude of the transmission signal $A_S$.

Finally, $A_{int}$ is the amplitude of the reflection signal that is reflected on the interface between the first component 4a and the second component 4b. Since the impedance of the component 4a is greater than the impedance of the component 4b, the amplitude $A_{int}$ also opposes the amplitude $A_S$ of the transmission signal.

Furthermore, it is illustrated in FIG. 3 that the measuring signal is attenuated during the propagation along the signal line 5 with different attenuation coefficients $\alpha_0$, $\alpha_1$, $\alpha_2$, $\alpha_3$ dependent on the path. In the area of the signal line head 6, the measuring signal is attenuated with an attenuation coefficient $\alpha_0$. Within the container 3, the attenuation of the measuring signal is dependent on the fill level and thus on the path of the measuring signal. In the illustrated embodiment, three attenuation ranges are differentiated: In a first range $0 \leq X < X_1$, wherein $X_1$ is the distance to the process connection 9, the measuring signal is attenuated with an attenuation coefficient $\alpha_1$. In a second range $X_1 \leq X < X_2$, the measuring signal is attenuated with an attenuation coefficient $\alpha_2$ and in a third range $X_2 \leq X < X_3$, the measuring signal is attenuated with an attenuation coefficient $\alpha_3$.

The illustrated fill level meter is additionally designed to carry out a method described in FIG. 1 or FIG. 2 during operation.

All in all, a fill level meter 2 is illustrated that has a particularly high measuring accuracy due to the consideration of the processes acting on the transit time and the amplitude of the transmission or reflection signals, on the one hand, and, on the other hand, due to the fact that no further measuring arrangement is present other than the measuring arrangement for determining the fill level, it is particularly simply designed.

What is claimed is:

1. A method for determining a fill level of a process medium arranged in a container using a time domain reflectometry (TDR) fill level meter having at least one signal line for guiding an electromagnetic signal, a signal line head and an electronics unit, the signal line extending into the process medium, the method comprising:
   generating a pulsed transmitter signal with an amplitude $A_S$ using the electronics unit, wherein the transmission signal propagates along the signal line as a measuring signal with changing amplitude,
   detecting and evaluating at least one reflection signal with an amplitude $A_{refl}$ with the electronics unit, wherein the reflection signal is a reflection of the measuring signal on an interface between a first and a second medium, wherein the first medium has a first impedance $z_0$ and the second medium has a second impedance $z_1$,
   determining a relative permittivity $e_r$ of the second medium at least in dependence on the amplitude of the measuring signal transmitted through the first medium and the amplitude $A_{refl}$ of the reflection signal,
   wherein a ratio of the first impedance $z_0$ and the second impedance $z_1$ is additionally taken into consideration in determining the relative permittivity $\varepsilon_r$ of the second medium, and
   wherein, based on the determined relative permittivity $\varepsilon_r$, a propagation speed of the measuring signal and the reflection signal is determined in the second medium, that a transit time of the measuring signal and the reflection signal is determined and, based thereupon, that at least the fill level of the process medium in the container and/or the position of an interface between a first and a second component of a multi-component process medium in the container are determined.

2. The method according to claim 1, wherein the measuring signal transmitted through the first medium results from the transmission signal taking into account at least one of attenuation due to propagation along a signal line or due to at least one further reflection on a further interface.

3. The method according to claim 1, wherein the signal line head is connected to the container via a flange-like process connection, wherein the second medium is a gaseous medium that is arranged above the process medium and wherein the reflection of the measuring signal takes place on the interface of the flange-like process connection and the interior of the container.

4. The method according to claim 3, wherein the determination of a relative permittivity $\varepsilon_{r,gas}$ of the gaseous medium takes place using the following formula:

$$\varepsilon_{r,gas} = \left( \frac{z_{1\_gas}}{z_{0\_SK}} \cdot \frac{\alpha_0 - \frac{A_{fl}}{A_S}}{\alpha_0 + \frac{A_{fl}}{A_S}} \right)^2,$$

wherein $A_{fl}$ is the amplitude of the reflection signal of a reflection on the interface of the preferably flange-like process connection and the interior of the container, wherein $A_S$ is the amplitude of the generated transmission signal, wherein $\alpha_0$ characterizes the attenuation of the measuring signal within the signal line head, wherein $z_{0\_SK}$ is the impedance of the signal line head and wherein $z_{1\_gas}$ is the impedance of the gaseous phase above the process medium.

5. The method according to claim 1, wherein the second medium is the process medium or, in the case of a multicomponent process medium, the uppermost component of the process medium, wherein the reflection of the measuring signal takes place on the surface of the process medium or the uppermost component of the process medium, and wherein the reflection signal has an amplitude $A_{lev}$.

6. The method according to claim 5, wherein, to determine a relative permittivity $\varepsilon_{r,pm1}$ of the process medium or of the uppermost component of the process medium, the amplitude of the reflection signal $A_{lev}$ is corrected in such a manner that the attenuation of the measuring signal due to the propagation in the gaseous medium arranged above the process medium is taken into account.

7. The method according to claim 6, wherein different attenuation coefficients $\alpha$ are taken into account in determining a corrected amplitude $A_{lev\_cr}$ in dependence on the fill level X of the process medium and, thus, on the path of the measuring signal.

8. The method according to claim 7, wherein the corrected amplitude $A_{lev\_cr}$ is determined in dependence on the fill level X of the process medium according to one of the following formulas:

$$-A_{lev\_cr} = \frac{A_{lev}}{e^{\alpha_1 X}}$$

for $0 \leq X < X_1$, wherein $X_1$ is the distance to the process connection and wherein the range $0 \leq X < X_1$ defines a first attenuation range with an attenuation coefficient $\alpha_1$, $$-A_{lev\_cr} = \frac{A_{lev}}{e^{\alpha_2(X-X_1)}e^{\alpha_1 X_1}}$$

for $X_1 \leq X < X_2$, wherein $X_2$ is the distance to the process connection and wherein the range $X_1 \leq X < X_2$ defines a second attenuation range with an attenuation coefficient $\alpha_2$, $$-A_{lev\_cr} = \frac{A_{lev}}{e^{\alpha_3(X-X_2)}e^{\alpha_2(X_2-X_1)}e^{\alpha_1 X_1}}$$

for $X_2 \leq X < X_3$, wherein $X_3$ is the distance to the process connection and wherein the range $X_2 \leq X < X_3$ defines a third attenuation range with an attenuation coefficient $\alpha_3$.

9. The method according to claim 5, wherein the determination of the relative permittivity $\varepsilon_{r,pm1}$ of the process medium or of the uppermost component of the process medium takes place according to the following formula:

$$\varepsilon_{r,pm\_1} = \left( \frac{1 - \frac{A_{lev\_cr}}{\alpha_0 A_S \left(1 - \left(\frac{A_{fl}}{\alpha_0 A_S}\right)^2\right)}}{1 + \frac{A_{lev\_cr}}{\alpha_0 A_S \left(1 - \left(\frac{A_{fl}}{\alpha_0 A_S}\right)^2\right)}} \right)^2 \cdot \varepsilon_{r,gas},$$

wherein $A_{fl}$ is the amplitude of the reflection signal of a reflection on the interface of the preferably flange-like process connection and the interior of the container, wherein $A_S$ is the amplitude of the generated transmission signal, wherein $\alpha_0$ characterizes the attenuation of the measuring signal within the signal line head, and wherein $A_{lev\_cr}$ is the amplitude of the reflection on the process medium corrected by the attenuation, and $\varepsilon_{r,gas}$ is the relative permittivity of the gaseous medium.

10. The method according to claim 1, wherein the process medium has at least three components, and that in order to determine the position of an interface between a component n and another component (n+1), wherein the component n corresponds to the first medium and the component (n+1) corresponds to the second medium, at least the relative permittivity $\varepsilon_{r,pm\_n}$ of the component n is determined, wherein the determination takes place using the following formula:

$$\varepsilon_{r,pm\_n} = \left( \frac{1 - \frac{A_{lev\_cr\_n}}{A_{x\_n}}}{1 + \frac{A_{lev\_cr\_n}}{A_{x\_n}}} \right)^2 \cdot \varepsilon_{r,pm\_(n-1)}$$

wherein $A_{lev\_cr\_n}$ is the corrected amplitude of the reflection signal of an amplitude $A_{lev\_n}$, wherein $A_{lev\_n}$ is the amplitude of the reflection signal of a reflection of the measuring signal on the interface between the component (n−1) and the component n, and $A_{fl}$ is the amplitude of the reflection signal of a reflection on the interface of the process connection, wherein the corrected amplitude takes into account the attenuation of the measuring signal due to the propagation in the gaseous medium above the process medium and/or in the component or the components of the process medium that is/are arranged above the component n, and wherein $A_{x\_n}$ is the amplitude of the measuring signal transmitted through the first medium or, respectively, the component n and wherein is determined using the following formula:

$$A_{x\_n} = \alpha_0 A_S \left(1 - \left(\frac{A_{fl}}{\alpha_0 A_S}\right)^2\right) \left(1 - \left(\frac{\sqrt{\varepsilon_{r,gas}} - \sqrt{\varepsilon_{r,pm\_1}}}{\sqrt{\varepsilon_{r,gas}} + \sqrt{\varepsilon_{r,pm\_1}}}\right)^2\right)$$

$$\prod_{k=2}^{n-1} \left(1 - \left(\frac{\sqrt{\varepsilon_{r,pm\_k-1}} - \sqrt{\varepsilon_{r,pm\_k}}}{\sqrt{\varepsilon_{r,pm\_k-1}} + \sqrt{\varepsilon_{r,pm\_k}}}\right)^2\right) =$$

$$A_{x\_2} \prod_{k=2}^{n-1} \left(1 - \left(\frac{\sqrt{\varepsilon_{r,pm\_k-1}} - \sqrt{\varepsilon_{r,pm\_k}}}{\sqrt{\varepsilon_{r,pm\_k-1}} + \sqrt{\varepsilon_{r,pm\_k}}}\right)^2\right)$$

wherein $A_{x\_2}$ is the amplitude of the measuring signal on the interface between the uppermost and the second-uppermost component of the process medium.

11. A fill level meter for determining a fill level of a process medium in a container, comprising:
  at least one signal line for guiding an electromagnetic signal,
  a signal line head and an electronics unit,
  wherein the electronics unit is configured for generating a pulsed transmitter signal with an amplitude $A_s$, so that the transmission signal propagates along the signal line as a measuring signal with changing amplitude,
  wherein the electronics unit is also configured for generating a pulsed transmission signal directed to propagate as a measuring signal along the signal line and for detecting and evaluating at least one reflection signal with an amplitude $A_{refl}$, the reflection signal being a reflection of the measuring signal on an interface between a first medium having a first impedance $z_0$ and a second medium having a second impedance $z_1$,
  wherein the electronics unit is also configured for determining a relative permittivity $\varepsilon_r$ of the second medium at least in dependence on an amplitude of the measuring signal transmitted through the first medium and the amplitude $A_{refl}$ of the reflection signal,
  wherein a ratio of the first impedance $z_0$ and the second impedance $z_1$ is additionally taken into consideration in determining the relative permittivity $\varepsilon_r$ of the second medium,
  wherein, based on the determined relative permittivity $\varepsilon_r$, the electronics unit is configured to determine a propagation speed of the measuring signal and the reflection signal in the second medium, a transit time of the measuring signal and the reflection signal and, based thereupon, the electronics unit is configured to determine at least the fill level of the process medium in the container and/or the position of an interface between a first and a second component of a multi-component process medium in the container.

\* \* \* \* \*